(12) United States Patent
Hagiwara et al.

(10) Patent No.: US 11,745,249 B2
(45) Date of Patent: Sep. 5, 2023

(54) ROTARY CAULKING DEVICE, METHOD OF MANUFACTURING HUB UNIT BEARING AND METHOD OF MANUFACTURING VEHICLE

(71) Applicant: NSK LTD., Tokyo (JP)

(72) Inventors: Nobuyuki Hagiwara, Fujisawa (JP); Tsuyoshi Kamoda, Hanyu (JP)

(73) Assignee: NSK LTD., Tokyo (JP)

( * ) Notice: Subject to any disclaimer, the term of this patent is extended or adjusted under 35 U.S.C. 154(b) by 75 days.

(21) Appl. No.: 17/325,675

(22) Filed: May 20, 2021

(65) Prior Publication Data

US 2021/0268568 A1  Sep. 2, 2021

Related U.S. Application Data

(62) Division of application No. 16/634,715, filed as application No. PCT/JP2018/039596 on Oct. 25, 2018, now Pat. No. 11,077,484.

(30) Foreign Application Priority Data

Nov. 20, 2017  (JP) ................................. 2017-223090

(51) Int. Cl.
| | |
|---|---|
| B23P 11/00 | (2006.01) |
| B21J 9/02 | (2006.01) |
| F16C 19/38 | (2006.01) |
| F16C 35/063 | (2006.01) |
| B21K 25/00 | (2006.01) |
| B21D 39/00 | (2006.01) |
| B21D 53/10 | (2006.01) |

(52) U.S. Cl.
CPC .............. *B21J 9/025* (2013.01); *B21D 39/00* (2013.01); *B21D 53/10* (2013.01); *B21K 25/00* (2013.01); *F16C 19/38* (2013.01); *F16C 35/063* (2013.01); *F16C 2326/02* (2013.01)

(58) Field of Classification Search
CPC .......... B21J 9/025; B21D 53/10; B21D 39/00; B21K 25/00; B21K 1/05; F16C 19/38; F16C 35/063; F16C 2326/02; F16C 43/04; B60B 27/02; B60B 27/0084; B32K 25/00; B23P 11/00
See application file for complete search history.

(56) References Cited

U.S. PATENT DOCUMENTS

2005/0018937 A1 * 1/2005 Lagorgette .......... B60B 27/0084
                                                         29/898.07
2007/0217728 A1   9/2007 Kashiwagi et al.

FOREIGN PATENT DOCUMENTS

| JP | 11044319 A | 2/1999 | |
| JP | 2003-021153 A | 1/2003 | |
| JP | 2003021153 A * | 1/2003 | ......... B60B 27/0084 |

(Continued)

OTHER PUBLICATIONS

English translation of JP2003028179A (Year: 2003).*

(Continued)

*Primary Examiner* — Jun S Yoo
(74) *Attorney, Agent, or Firm* — Sughrue Mion, PLLC (57) ABSTRACT

A hub main body (13z) is supported by a support portion (18). At least one block (22) is engaged with a stationary flange (6) of an outer ring (2). As a support plate (21) rotates, the outer ring (2) rotates. A caulking portion (16) is formed by pressing a pressing die (20) on a cylindrical portion (31).

9 Claims, 7 Drawing Sheets

(56) References Cited

FOREIGN PATENT DOCUMENTS

| | | | | | |
|---|---|---|---|---|---|
| JP | 2003028179 A | * | 1/2003 | ............. | B21J 9/025 |
| JP | 2003028179 A | | 1/2003 | | |
| JP | 2005-121211 A | | 5/2005 | | |
| JP | 2005172049 A | * | 6/2005 | | |
| JP | 2006-132711 A | | 5/2006 | | |
| JP | 2006132711 A | * | 5/2006 | ............. | B21J 9/025 |
| JP | 2006-153053 A | | 6/2006 | | |

OTHER PUBLICATIONS

English translation of JP2005172049A (Year: 2005).*
International Search Report of PCT/JP2018/039596 dated Jan. 29, 2019.

* cited by examiner

ROTARY CAULKING DEVICE, METHOD OF MANUFACTURING HUB UNIT BEARING AND METHOD OF MANUFACTURING VEHICLE

CROSS REFERENCE TO RELATED APPLICATIONS

This application is a divisional of U.S. application Ser. No. 16/634,715 filed Jan. 28, 2020, which is a National Stage of International Application No. PCT/JP2018/039596 filed Oct. 25, 2018, claiming priority based on Japanese Patent Application No. 2017-223090 filed Nov. 20, 2017, the contents of which are incorporated herein by reference in their entirety.

TECHNICAL FIELD

The present invention relates to a method of manufacturing a hub unit bearing for rotatably supporting a wheel and a braking rotor of a vehicle relative to a suspension device.

BACKGROUND ART

Wheels and braking rotors of a vehicle are rotatably supported by hub unit bearings relative to the suspension device. A hub unit bearing is configured by rotatably supporting a hub, which supports a wheel and a braking rotor, via a plurality of rolling elements on an inner diameter side of an outer ring supported by and fixed to a suspension device. The hub is configured by supporting and fixing an inner ring to a hub main body. The hub main body has a rotary flange for supporting the wheel and the braking rotor. The inner ring, which is a separate member, is externally fitted into an outer circumferential surface on the hub main body. An axially inner end face of the inner ring is pressed and held by a caulking portion provided at an axially inner end portion of the hub main body. The caulking portion is formed by plastically deforming a cylindrical portion provided at the axially inner end portion of the hub main body outward in the radial direction.

Patent Document 1 (Japanese Patent Application, Publication No. 2003-21153) discloses a method of forming a caulking portion by plastically deforming a cylindrical portion outward in the radial direction. In this method, while a tip portion of a pressing die (a caulking jig) having a central axis inclined relative to a central axis of a hub main body (a shaft portion) is pressed against a cylindrical portion (a cylinder-like portion), the pressing die is gyrated around the central axis of the hub main body. In the method disclosed in Patent Document 1, balls that are rolling elements are rotated and revolved by rotating an outer ring while processing the caulking portion. This prevents the formation of indentations on the inner and outer rings.

In the structure disclosed in Patent Document 1, a rotary drive unit (a rotation assist jig) for rotating the outer ring is configured by attaching pins to a plurality of places on a circumference of an annular plate. When processing the caulking portion, while the pins are inserted into support holes (bolt mounting holes) provided in a stationary flange (a flange) of the outer ring, or the pins are hooked on an outer circumferential surface of the stationary flange, the outer ring is driven to rotate by rotating the rotary drive unit using a motor.

CITATION LIST

Patent Literature

[Patent Document 1] Japanese Patent Application, Publication No. 2003-21153

SUMMARY OF INVENTION

Technical Problem

In the structure described in Patent Document 1, the pins of the rotary drive unit are inserted into the support holes of the stationary flange or are hooked on the outer circumferential surface of the stationary flange. Therefore, when assembling the rotary drive unit (rotation assist jig) to the stationary flange, phase alignment in the circumferential direction is required, whereby the productivity is reduced accordingly. In addition, in order to prevent the outer ring from rotating (co-rotating) with the rotary drive unit when implementing phase alignment work of the rotary drive unit and the stationary flange in the circumferential direction, it is necessary to press down the outer ring using a pressing rod. Such a pressing rod has to be retracted when processing the caulking portion, and it is necessary to provide an actuator for allowing the rod to move close to and away from the outer ring, which increases the costs of the manufacturing device.

An object of the present invention is to realize a rotary caulking device and a method of manufacturing a hub unit bearing in which productivity can be improved and costs can be reduced without need for performing phase alignment of a rotary drive unit and a stationary flange in the circumferential direction.

Solution to Problem

A rotary caulking device according to one aspect of the present invention includes a support portion, a rotary drive unit, and a pressing die. The support portion has a reference axis. The rotary drive unit has an annular support plate which is supported to be able to move close to and away from the support portion and which can be driven to rotate about a central axis coaxial with the reference axis, and blocks which are supported at one or more places of a circumference of the support plate to be able to be displaced in an axial direction thereof. The pressing die is supported to be able to perform a swinging and rotary motion about a main axis coaxial with the reference axis, and is rotatably supported about a rotation axis inclined relative to the main axis.

The blocks may be supported at a plurality of places of the support plate in a circumferential direction thereof.

Elastic forces directed in a direction toward the support portion with respect to the axial direction may be applied to the blocks. In this case, elastic members can be installed between the support plate and the blocks.

A rolling bearing or a sliding bearing may be provided at a tip portion of the blocks. In this case, the rolling bearing or the sliding bearing can be made of, for example, a synthetic resin such as a polyamide resin or a polytetrafluoroethylene resin.

A rotary caulking device according to another aspect of the present invention is used for manufacturing a bearing unit. The rotary caulking device includes a base which supports a unit main body of the bearing unit, a pressing die which is configured to perform a caulking motion relative to the unit main body to which an inner ring is attached, and an adapter via which an outer ring moves around an axis of the unit main body. The adapter has an adapter main body, and at least one block held in the adapter main body. The at least one block is disposed to be movable in the axial direction of the unit main body relative to the adapter main body.

A method of manufacturing a hub unit bearing according to another aspect of the present invention includes supporting a hub main body, and caulking the hub main body to which an inner ring is attached. The caulking includes pressing a pressing die on the hub main body while the pressing die rotates, and moving an outer ring around an axis of the hub main body via an adapter. The adapter has an adapter main body and at least one block held in the adapter main body. The at least one block is disposed to be movable in an axial direction of the hub main body relative to the adapter main body.

In another aspect of the present invention, a hub unit bearing which in an object of a method of manufacturing a hub unit bearing includes an outer ring, a hub, and a plurality of rolling elements. The outer ring has an outer ring raceway having double rows on an inner circumferential surface thereof, and has a stationary flange protruding radially outward. The hub has an inner ring raceway having double rows on an outer circumferential surface thereof. The plurality of rolling elements are rotatably disposed between the inner ring raceway and the outer ring raceway. The stationary flange has a plurality of protruding portions protruding outward in a radial direction thereof. The hub includes a hub main body and an inner ring, in which the inner ring is externally fitted into a portion near one axial end portion of the hub main body, and the one axial end portion of the inner ring is pressed and held by a caulking portion formed by plastically deforming radially outward a cylindrical portion provided at one axial end portion of the hub main body.

The method of manufacturing the hub unit bearing includes the processes of supporting the hub main body on the support portion so that the central axis of the hub main body is coaxial with the reference axis, engaging a tip portion of the block (at least one block in the case of a plurality of blocks) with the stationary flange such that power in a rotating direction thereof can be transmitted by displacing the rotary drive unit in the axial direction, driving the outer ring to rotate by driving the rotary drive unit to rotate, and forming the caulking portion by plastically deforming the cylindrical portion radially outward by pressing the tip portion of the pressing die on the cylindrical portion while rotating the pressing die around the main axis.

In a method of manufacturing a vehicle according to another aspect of the present invention, a hub unit bearing is manufactured by the method of manufacturing the hub unit bearing of the present invention as described above.

Advantageous Effects of Invention

According to a rotary caulking device and a method of manufacturing a hub unit bearing of the present invention, it is unnecessary to perform phase alignment of a rotary drive unit and a stationary flange in the circumferential direction, and productivity can be improved and costs can be reduced.

DESCRIPTION OF EMBODIMENTS

Figure 1:
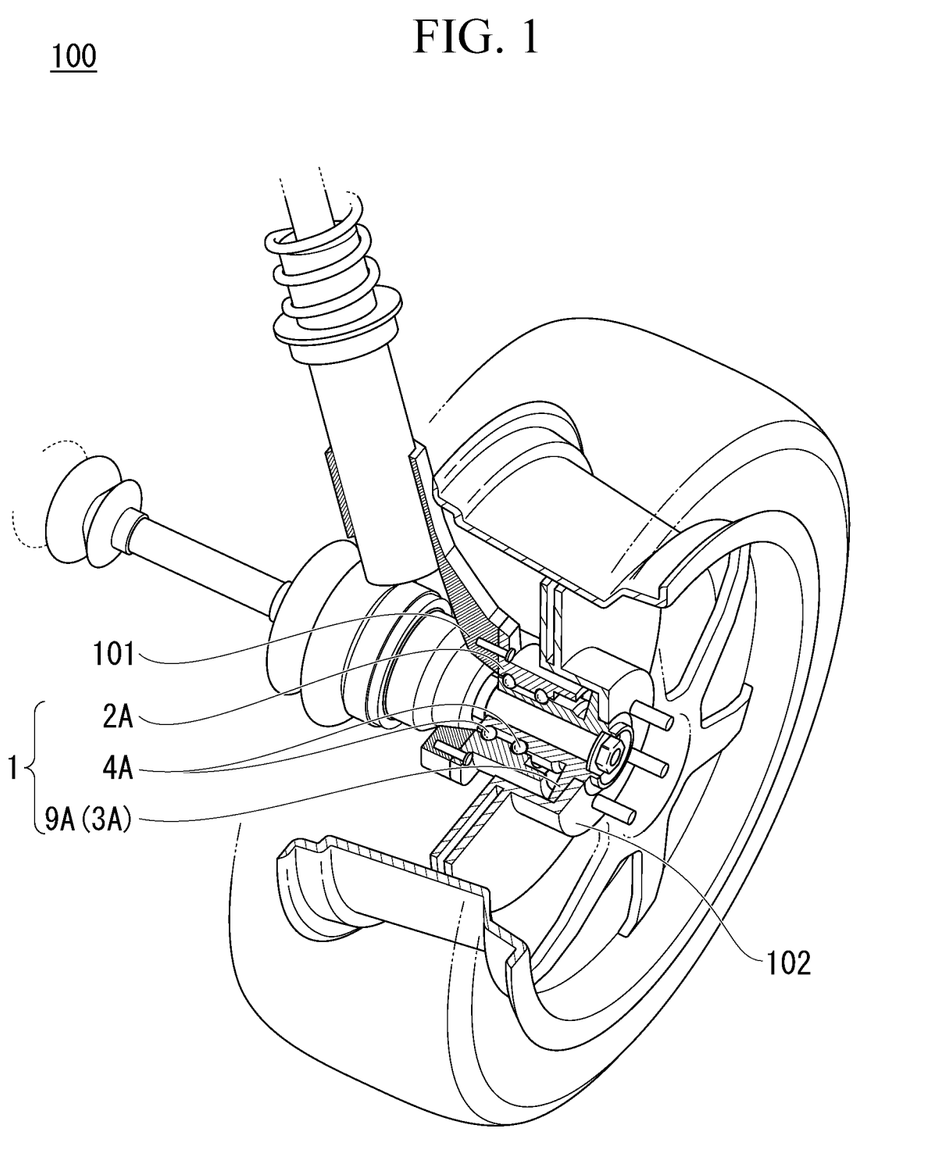
FIG. 1 is a partial schematic view of a vehicle including a hub unit bearing (a bearing unit).

FIG. 1 is a partial schematic view of a vehicle 100 including a hub unit bearing (a bearing unit) 1. The present invention can be applied to all of a hub unit bearing for a driving wheel and a hub unit bearing for a driven wheel. In FIG. 1, a hub unit bearing 1 is for a driving wheel, and includes an outer ring 2A, a hub 3A, and a plurality of rolling elements 4A. The outer ring 2A is fixed to a knuckle 101 of a suspension device using bolts or the like. A wheel (and a braking rotor) 102 is fixed to a flange (a rotary flange) 9A provided in the hub 3A using bolts or the like. Also, the vehicle 100 can have the same support structure as described above with respect to the hub unit bearing 1 for a driven wheel.

Figure 2:
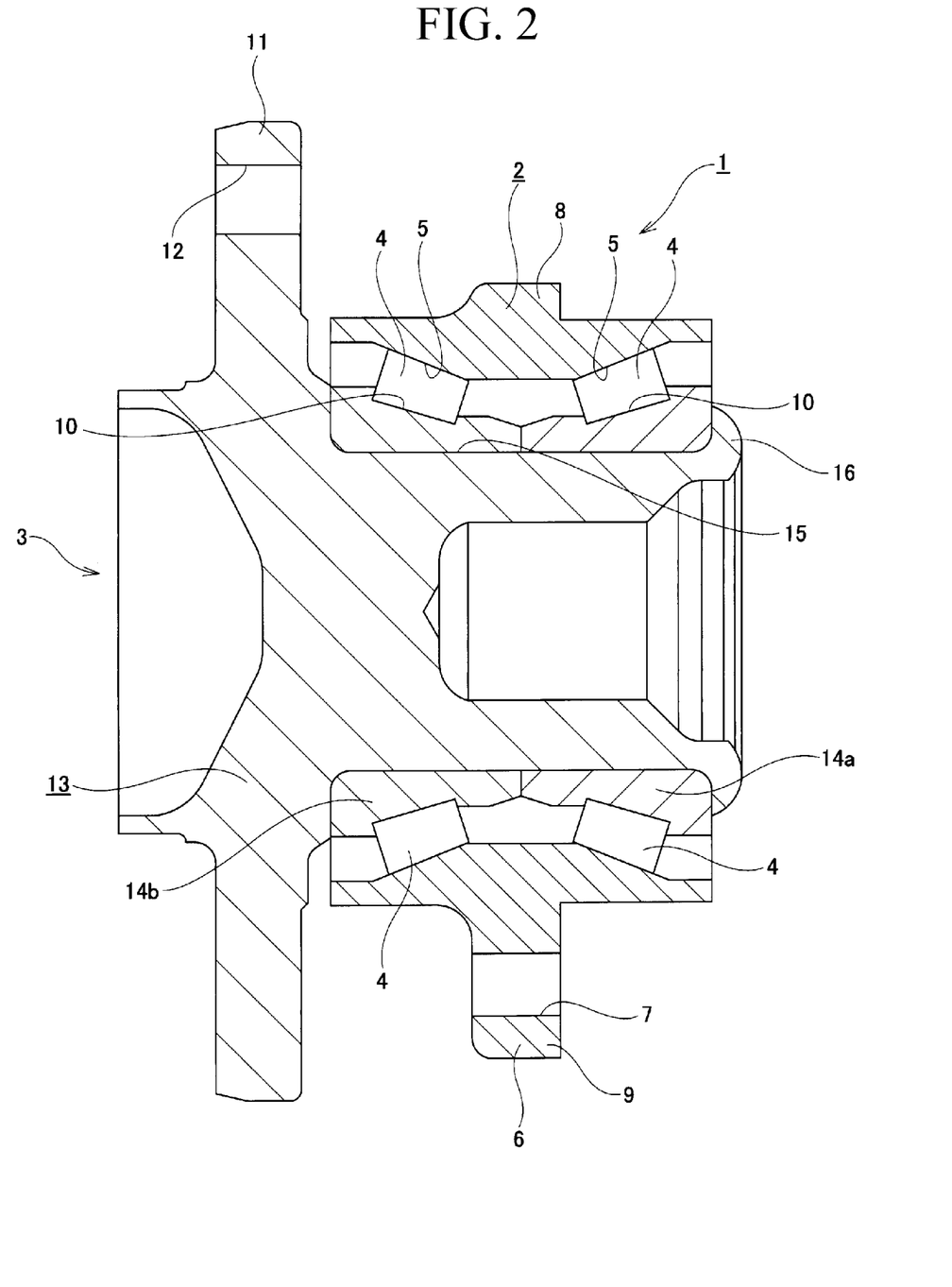
FIG. 2 is a cross-sectional view showing a hub unit bearing which is a target of a first example of the embodiment of the present invention.

FIG. 2 shows a hub unit bearing (a bearing unit) 1 for a driven wheel. The hub unit bearing 1 includes an outer ring 2, a hub 3, and a plurality of rolling elements 4. The outer ring 2 has an outer ring raceway 5 having double rows on an inner circumferential surface thereof, and a stationary flange 6 (a flange) protruding outward in a radial direction thereof at an intermediate portion in an axial direction thereof. The stationary flange 6 has support holes 7 at plural positions in a circumferential direction thereof. The outer ring 2 is coupled and fixed to a knuckle of a suspension device by bolts inserted or screwed into the support holes 7. This stationary flange 6 has an annular disc-shaped base portion 8, and protruding portions (ears) 9 protruding radially outward from plural places (four places in the example shown) in the circumferential direction on an outer circumferential surface of the base portion 8. Each of the support holes 7 is provided in the protruding portion 9 to penetrate the protruding portion 9 in the axial direction. The protruding portion 9 has a surface (an upper surface or a support surface) 6a that intersects the axial direction.

The hub 3 is disposed coaxially with the outer ring 2 on an inner diameter side of the outer ring 2. Also, the hub 3 has an inner ring raceway 10 of double rows on an outer circumferential surface thereof. In addition, the hub 3 has a rotary flange 11 protruding radially outward at an axially outer portion which protrudes axially outward over an axially outer end face of the outer ring 2. The rotary flange 11 has mounting holes 12 at plural places in a circumferential direction thereof. The wheel and the braking rotor are supported by and fixed to the rotary flange 11 by studs press-fitted into the mounting holes 12 and nuts screwed onto tips portions of these studs.

Also, "outside" in the axial direction refers to the left side in FIG. 2, which is outside of the vehicle in a width direction thereof in a state where the hub unit bearing 1 is assembled on the suspension device. On the other hand, the right side of FIG. 2, which is inside of the vehicle in the width direction, is referred to as "inside" in the axial direction.

The plurality of rolling elements 4 are disposed to be rollable between the outer ring raceway 5 having double rows and the inner ring raceway 10 having double rows with plural rolling elements 4 disposed in each row. Also, in the example shown, tapered rollers are used as the rolling elements 4. In another example, balls can also be used as the rolling elements 4.

In the example shown, the hub 3 has a hub main body (a unit main body) 13 and a pair of inner rings 14a and 14b. The double rows of the inner ring raceway 10 are provided respectively on an outer circumferential surface of each of the pair of inner rings 14a and 14. The hub main body 13 has the rotary flange 11 on an outer side in the axial direction. Also, the hub main body 13 has a cylindrical fitting surface portion 15 on an outer circumferential surface thereof in a range from a middle portion to an inner side in the axial direction. In the hub 3, the pair of inner rings 14a and 14b are externally fitted into the fitting surface portion 15 of the hub main body 13. A caulking portion 16 is provided at an axially inner end portion of the hub main body 13. An axially inner end face of the inner ring 14a on an axially inner side thereof is pressed and held by the caulking portion 16. The hub 3 is configured by coupling and fixing the pair of inner rings 14a and 14b to the hub main body 13.

Figure 3:
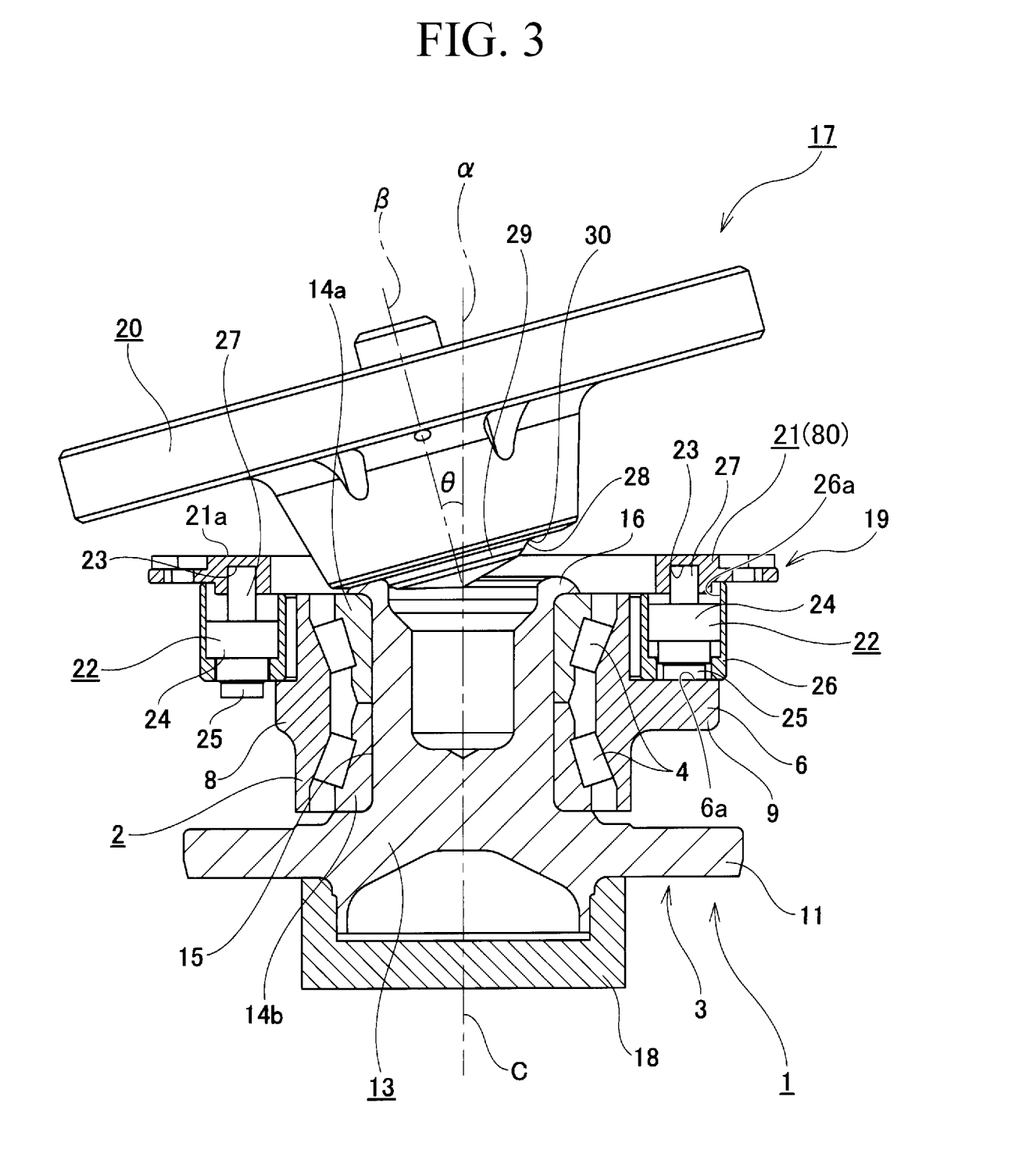
FIG. 3 is a cross-sectional view showing a rotary caulking device according to the first example of the embodiment of the present invention.

FIG. 3 shows a rotary caulking device 17. In the hub main body (unit main body) 13z (see (A) and (B) of FIG. 6) before the caulking portion 16 is formed, one axial end portion (an axially inner end portion; an upper end portion in (A) and (B) of FIG. 6 has a cylindrical shape (a cylindrical portion 31). The rotary caulking device 17 forms the caulking portion 16 by plastically deforming (forging, heading, pressing, bending, etc.) the cylindrical portion 31 (the axial end portion of the cylindrical portion 31) outward in the radial direction. The rotary caulking device 17 includes a support portion (a base) 18 for loading the hub main body 13z, a rotary drive unit 19 for driving the outer ring 2 to rotate, and a pressing die 20.

The support portion (base) 18 has a reference axis C in a vertical direction. The hub main body 13z is loaded on an upper surface of the support portion 18 such that the other axial end portion (an axially outer end portion; a lower end portion in (A) and (B) of FIG. 6) thereof is on a lower side, and its own central axis is coaxial with the reference axis C.

The rotary drive unit 19 includes a drive source (not shown) and an adapter (rotary drive jig) 80. The outer ring 2 moves around the axis of the hub main body 13z via the adapter 80. The adapter 80 includes a support plate (an adapter main body) 21 and a plurality of (eight in the example shown) blocks 22. The support plate 21 is formed in a circular disc shape centered on a central axis coaxial with the reference axis C of the support portion 18. Also, the support plate 21 (adapter main body) is supported to be able to move up and down above the support portion 18, that is, to be able to move closer to and away from the support portion 18. In addition, the support plate 21 is configured to be rotatably supported about the central axis coaxial with the reference axis C and to be driven to rotate by means of the drive source (not shown) such as an electric motor. Further, the support plate 21 has seat portions 23 recessed upward at a plurality of places in the circumferential direction on a lower surface thereof. Positioning and buckling prevention of an elastic member (a biasing member) 27, which will be described later, are achieved by these seat portions 23.

Figure 4:
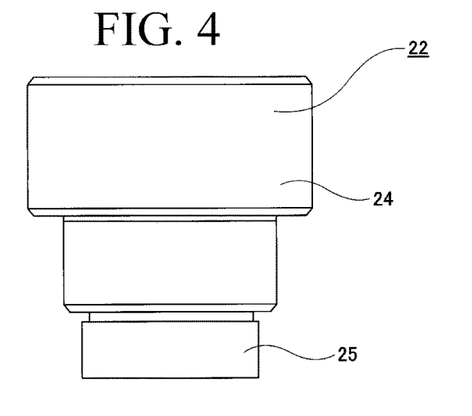
FIG. 4 is an enlarged side view of a block taken out.
Figure 5:
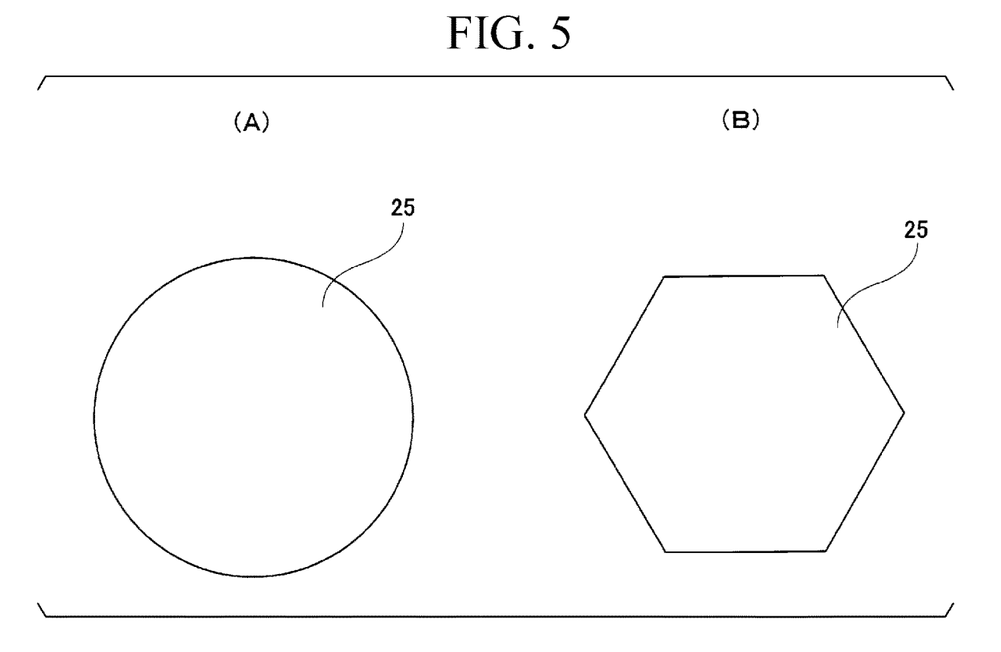
FIG. 5 is an end view showing a second example of a shape of a guide member.

In one example, each of the blocks 22 is at least partially made of a resin material. In another example, the block 22 is made of a material other than resin. For example, as shown in FIG. 4, the block 22 includes a block main body 24 and a guide member 25 made of synthetic resin. In the present example, the block main body 24 is formed in a stepped cylindrical shape. The guide member 25 is externally fitted into and supported by a tip portion (a lower end portion) of the block main body 24. In this example, the guide member 25 is a rolling bearing or a sliding bearing having a circular shape when viewed in the axial direction, as shown in (A) of FIG. 5. In the case of the stepped cylindrical shape of the block main body 24, as in the present example, the block main body 24 can rotate. In another example, the guide member 25 also may have a shape of, for example, a polygon (preferably a regular polygon) such as a regular hexagon, as shown in (B) of FIG. 5, when viewed in the axial direction. Also, the block 22 may also be formed in a prismatic shape of which cross-sectional shape is a regular polygon such as a square or a regular hexagon. In this case, a rolling bearing or a sliding bearing whose outer circumferential surface is a cylindrical surface can be externally fitted into and supported on the tip portion of the block.

In addition, when a rolling bearing is used as the guide member 25, an outer circumferential surface of the outer ring may be covered with a synthetic resin such as urethane, silicone, polyacetal, MC NYLON (a registered trademark) which is a type of polyamide resin. By covering the outer circumferential surface of the outer ring with a synthetic resin, it is possible to prevent metal parts from colliding with each other when a circumferential side surface of the protruding portion 9 of the stationary flange 6 is pressed by an outer circumferential surface of the guide member 25, so that damage to the stationary flange 6 can be prevented. Further, if necessary, a shaft-equipped rolling bearing in which a rotational shaft is supported by and fixed to the inner ring in advance can also be used as the guide member 25. That is, the rotational shaft of the shaft-equipped rolling bearing is supported at and fixed to the tip portion of the block main body 24 by tight fitting or screwing, whereby the guide member 25 can be provided at the tip portion of the block main body 24.

The plurality of blocks 22 are disposed movably in the axial direction of the hub main body 13z relative to the support plate 21. The support plate 21 has a plate member (an annular plate member) 21a and a housing member (a cover, a boss, a boss wall, or an annular wall) 26. The plate member 21a and the housing member 26 are integrally formed. Alternatively, the housing member 26 is fixed to the plate member 21a. The housing member 26 is disposed to surround the hub main body 13z. The housing member 26 has a cavity (or a notch) 26a in which the block 22 is at least partially housed. Each of the plurality of blocks 22 is disposed movably in the axial direction between a protruding state in which the block 22 protrudes at least partially in the axial direction from the support plate 21 (the adapter main body or the housing member 26), and a housed state. In the housed state, an axial end face of the block 22 abuts the upper surface 6a (a first surface) of the stationary flange 6 of the outer ring 2. In the protruding state, a side surface (a circumferential surface) of the block 22 is disposed to face the side surface (the side surface of the protruding portion 9 or a second surface) of the stationary flange 6 of the outer ring 2. The support plate 21 (adapter 80) has a biasing member (elastic member) 27 that applies a force in a direction toward the hub main body 13z to the block 22.

For example, the block 22 may be supported below the support plate 21 while a downward elastic force is applied thereto. That is, the block 22 is fitted into a cylindrical cover 26 supported to surround an opening of the seat portion 23 on the lower surface of the support plate 21. The elastic member (biasing member) 27 such as a torsion coil spring is disposed between an upper end face of the block 22 and the bottom surface of the seat portion 23. With this configuration, the guide member 25 protrudes downward from a lower opening of the cover 26 in a state where no upward force is applied to a tip surface (a lower surface) of the guide member 25 of the block 22. In addition, when the block 22 is formed in a prismatic shape, the cover 26 can be formed in a polygonal tube shape. The block 22 can reliably protrude relative to the support plate 21 due to the elastic member 27. In another example, instead of the elastic member 27, an actuator for moving the block 22 in the axial direction can be provided. Alternatively, the elastic member 27 can be omitted by using gravity or a magnetic force.

The pressing die 20 is disposed to perform a caulking motion (a rotary caulking motion or an orbital rotation motion) relative to the hub main body 13z to which the inner ring 14a is attached. The pressing die 20 has a main axis α coaxial with the reference axis C, and a rotation axis β inclined relative to the main axis α by a predetermined angle θ. In addition, a processing portion 28 for plastically deforming the cylindrical portion 31 of the hub main body 13z radially outward to form the caulking portion 16 is provided at a tip portion (a lower end portion) of the pressing die 20. Specifically, the processing portion 28 is configured by providing a convex portion 29 at the tip portion of the pressing die 20 and providing a curved surface portion 30 having an arc-shaped cross section on an outer circumferential surface of a base end portion of the convex portion 29. This pressing die 20 is supported to be able to move up and down above the rotary drive unit 19. Further, the pressing die 20 can be driven to rotate about the main axis α, and is rotatable about the rotation axis β.

A method of forming the caulking portion 16 by plastically deforming the cylindrical portion 31 of the hub main body 13z radially outward using the rotary caulking device 17 will be described with reference to FIG. 6 in addition to FIGS. 2 to 5. First, as shown in (A) of FIG. 6, the hub main body 13z before forming the caulking portion 16 is placed on the support portion 18 of the rotary caulking device 17 so that the other axial end portion is on the lower side, and the central axis of the hub main body 13z is coaxial with the reference axis C. Next, the pair of inner rings 14a and 14b, the plurality of rolling elements 4 and the outer ring 2 are assembled around the fitting surface portion 15 of the hub main body 13z.

Also, the order of assembling the pair of inner rings 14a and 14b, the plurality of rolling elements 4 and the outer ring 2 around the fitting surface portion 15 is not particularly limited. Specifically, for example, first, an axially outer side inner ring 14b is externally fitted into an axially outer half portion of the fitting surface portion 15, and the rolling elements 4 are installed around the axially outer side inner ring 14b. Next, the outer ring 2 is disposed around the fitting surface portion 15. Then, the rolling elements 4 are installed around an axially inner side inner ring 14a to form a subassembly, and this subassembly is inserted between an axially inner half portion of the fitting surface portion 15 and an axially inner side outer ring raceway 5.

Alternatively, the pair of inner rings 14a and 14b, the plurality of rolling elements 4 and the outer ring 2 may be made into a subassembly in advance, and this subassembly may be installed around the fitting surface portion 15.

Figure 6:
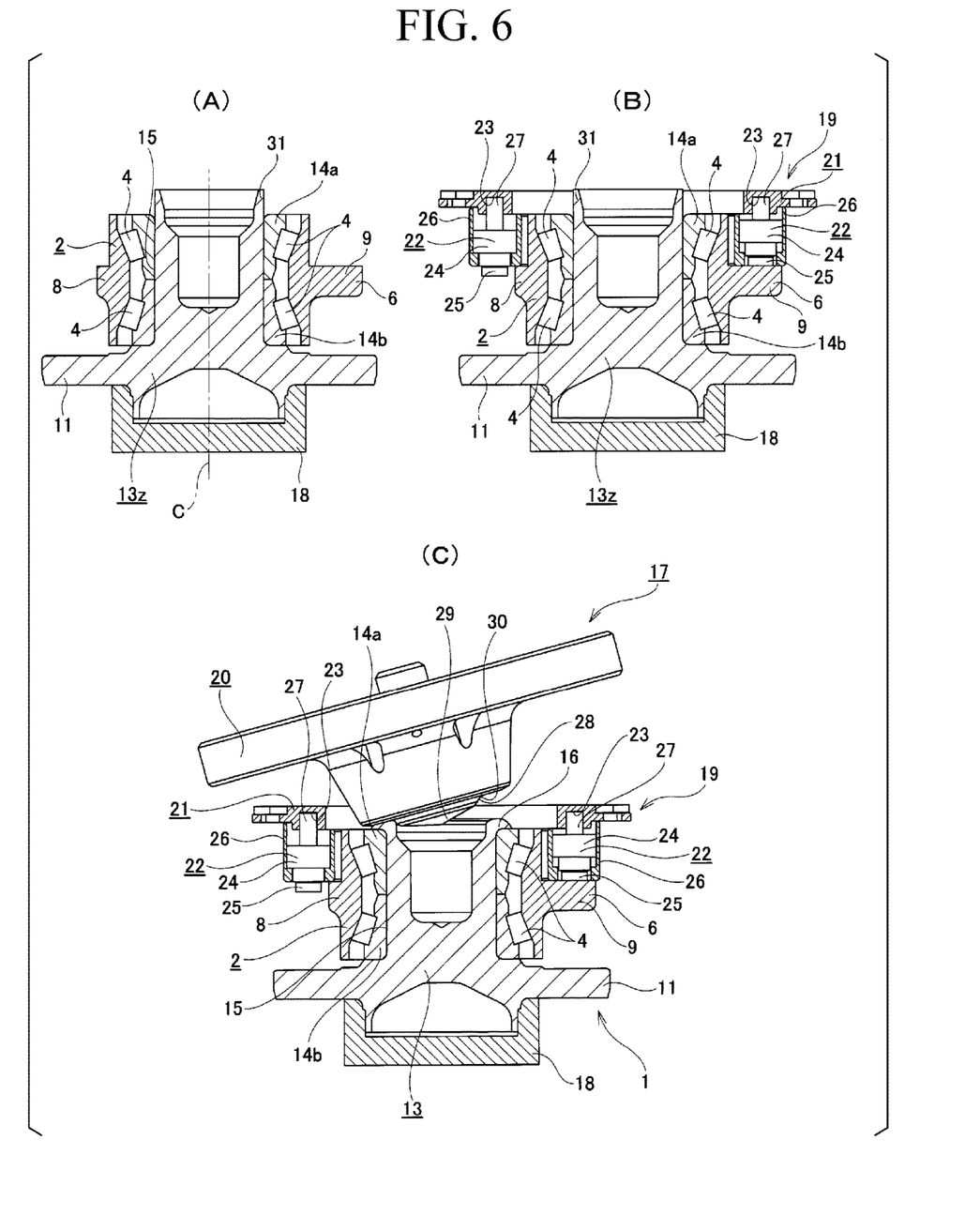
FIG. 6 is a cross-sectional view showing how the caulking portion is formed by using the rotary caulking device in the order of processes in the first example of the embodiment of the present invention.

After the pair of inner rings 14a and 14b, the plurality of rolling elements 4 and the outer ring 2 have been assembled around the fitting surface portion 15, the adapter 80 of the rotary drive unit 19 is then displaced downward, as shown in (B) of FIG. 6. As a result, at least one block 22 of the plurality of blocks 22 and the protruding portion 9 of the stationary flange 6 are in a state in which they are capable of engaging with each other (the protruding state) in a direction (a direction of rotating the outer ring 2 using the rotary drive unit 19) around the axis of the hub main body 13z.

That is, the blocks 22 of the adapter 80 of the rotary drive unit 19 are disposed at a plurality of places at equal intervals in the circumferential direction centering on the central axis coaxial with the reference axis C of the support portion 18. Therefore, as shown in (A) to (C) of FIG. 7, among the blocks 22, some of the blocks 22 (the blocks 22 represented by dashed-dotted lines in (A) to (C) of FIG. 7) have their tip surfaces at least partially facing axial end faces of the protruding portions 9 of the stationary flange 6, and the remaining blocks 22 are disposed at positions circumferentially offset from the protruding portions 9. An axial end face (a tip surface or a lower surface) of at least one block 22 (and a portion of the lower surface of the support plate 21) abuts the upper surface 6a (first surface) of the stationary flange 6 of the outer ring 2. As a result, the at least one block 22 is in the housed state housed in the support plate 21. The remaining blocks 22 are in the protruding state in which the blocks 22 at least partially protrude in the axial direction from the support plate 21 (the adapter main body or the housing member 26). As a result, the side surface (circumferential surface) of the block 22 is disposed to face the side surface (the side surface of the protruding portion 9 or the second surface) of the stationary flange 6 of the outer ring 2.

Figure 7:
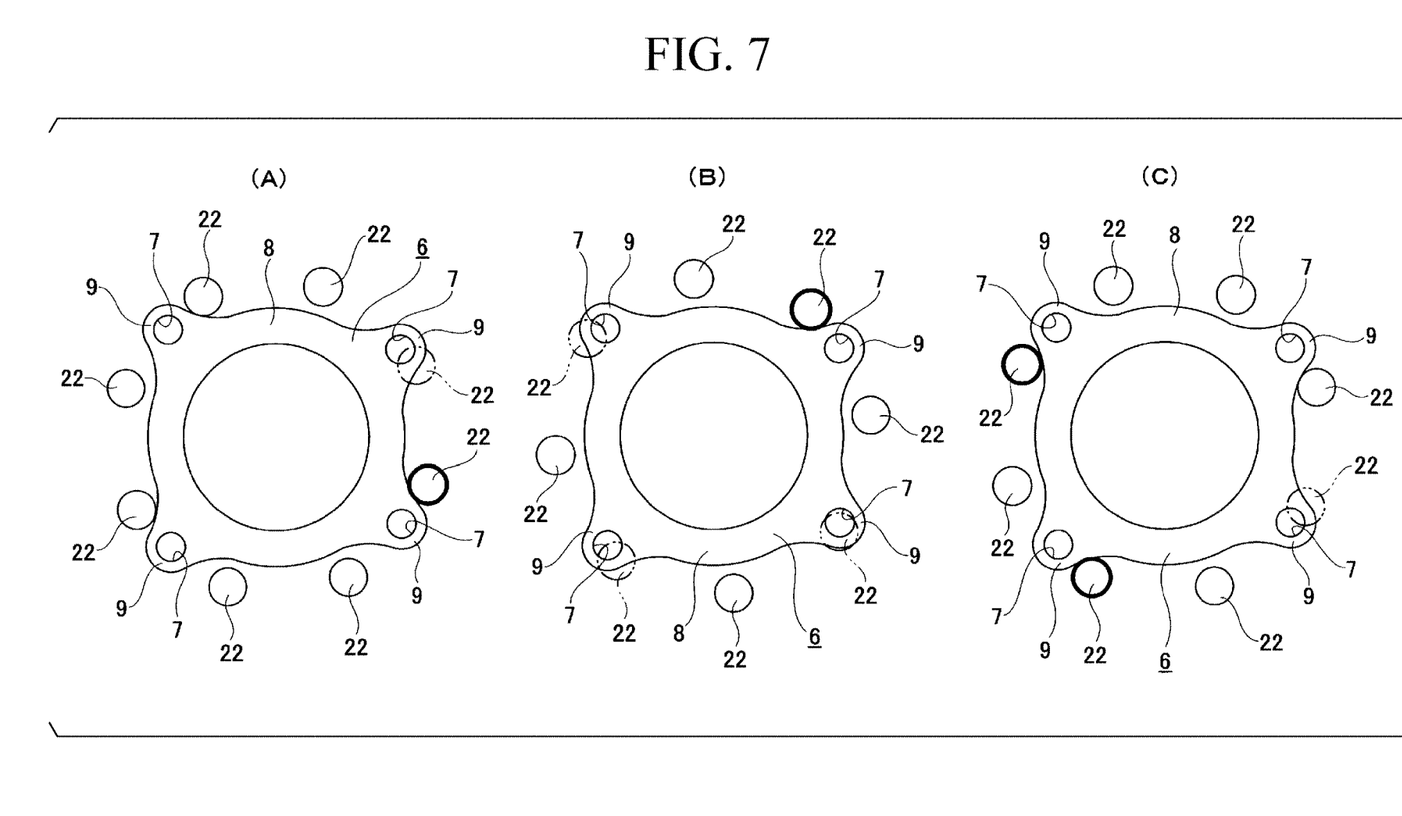
FIG. 7 is a schematic view showing a third example of an engagement state between a tip portion of the block and a stationary flange.

Further, downward elastic forces are applied to the blocks 22 by the elastic members 27. Therefore, when the adapter 80 of the rotary drive unit 19 is further displaced downward from a state in which the elastic members 27 are not elastically deformed, and a state in which vertical positions of the tip surfaces (lower end surfaces) of the blocks 22 facing axially inner surfaces of the protruding portions 9 coincide with an axially inner surface of the stationary flange 6, some of the blocks 22 (whose tip surfaces face the axially inner surfaces of the protruding portions 9) remain at the same vertical positions by elastically deforming the elastic member 27. On the other hand, the remaining blocks 22 (whose tip surfaces face the positions circumferentially offset from the protruding portions 9) are displaced downward together with the support plate 21 so that the guide members 25 of the remaining blocks 22 are disposed between the protruding portions 9 adjacent to each other in the circumferential direction.

In this state, the adapter 80 of the rotary drive unit 19 is driven to rotate clockwise in FIG. 7 about the central axis coaxial with the reference axis C. Then, the side surface of the protruding portion 9 is pressed at least in the circumferential direction by the outer circumferential surface of the guide member 25 of at least one block 22 (the blocks 22 represented by thick lines in (A) to (C) of FIG. 7) of the blocks 22. At this time, for example, a portion of the block 22 abuts on the support plate 21 to maintain the posture of the block 22. Thus, the outer ring 2 is driven to rotate, whereby the rolling elements 4 rotate and revolve. As described later, when forming the caulking portion 16, the formation of indentations on the outer ring raceway 5 and the inner ring raceway 10 is prevented.

Next, the pressing die 20 is displaced downward while orbital rotating the rotation axis β of the pressing die 20 about the main axis α, like a trajectory of a central axis due to the precession motion. The processing portion 28 of the pressing die 20 is pressed against the cylindrical portion 31 of the hub main body 13z. For example, the number of rotations (rotational speed) of the rotating motion of the rotation axis β of the pressing die 20 centered on the main axis α is made different from the number of rotations (rotational speed) of the rotary drive unit 19.

A downward load in the vertical direction and an outward load in the radial direction are applied to the cylindrical portion 31 from the pressing die 20. The portion to which the loads are applied in this manner changes continuously in the circumferential direction of the cylindrical portion 31. As a result, the hub main body 13z becomes the hub main body 13 in which the caulking portion 16 is formed by plastically deforming (caulking and expanding) the cylindrical portion 31 outward in the radial direction. In addition, in the hub unit bearing 1 after the caulking portion 16 is formed, the axially inner end face of the inner ring 14a on the axially inner side is pressed and held by the caulking portion 16, so that the pair of inner rings 14a and 14b are prevented from coming out of the fitting surface portion 15.

After the caulking portion 16 is formed, the rotation movement of the pressing die 20 is stopped, and the pressing die 20 is retracted upward. Subsequently, the rotary drive unit 19 is stopped to stop the rotation of the outer ring 2, and then the adapter 80 of the rotary drive unit 19 is retracted upward. Then, the hub unit bearing 1 is obtained by removing the hub main body 13 from the support portion 18.

According to the present embodiment as described above, it is not necessary to align the adapter 80 of the rotary drive unit 19 and the stationary flange 6 in the circumferential direction, so that the productivity can be improved and the costs can be reduced.

That is, the blocks 22 are disposed at a plurality of places at equal intervals in the circumferential direction on the rotary drive unit 19 (adapter 80). The downward elastic force is applied to each block 22 by the elastic member 27. For this reason, in the block 22 whose tip surface faces the axially inner surface of the stationary flange 6 (the axially inner surface of the protruding portion 9), the tip surface of the block 22 abuts the axially inner surface of the stationary flange 6 as the rotary drive unit 19 is displaced downward. Even when the rotary drive unit 19 (adapter 80) is displaced further downward, the elastic member 27 is elastically deformed, whereby the block 22 remains at the same vertical position. Therefore, regardless of the phase of the rotary drive unit 19 and the stationary flange 6 in the circumferential direction, in a state in which the rotary drive unit 19 has been displaced downward, at least one of the blocks 22 and the protruding portion 9 of the stationary flange 6 can be engaged such that power in the rotating direction can be transmitted.

In addition, in the present embodiment, the guide member 25 which is a rolling bearing or a sliding bearing using a synthetic resin is rotatably supported at the tip portion of the block 22. The side surface of the protruding portion 9 of the stationary flange 6 is pressed by the outer circumferential surface of the guide member 25 in the circumferential direction. This prevents damage such as scratches from being generated on the circumferential side surface of the protruding portion 9 and prevents the outer circumferential surface of the guide member 25 from being worn.

Further, as in this example, in the structure in which the reference axis C of the support portion 18 is disposed in the vertical direction, the support portion 18 is disposed on a lower side, and the rotary drive unit 19 is disposed above the support portion 18, the elastic member 27 disposed between the support plate 21 and the block 22 can be omitted by utilizing gravity.

In the case of practicing the present invention, the number of blocks of the rotary drive unit and the arrangement of the blocks in the circumferential direction may be determined appropriately in accordance with the shape of the stationary flange such that, when the rotary drive unit is displaced in the direction approaching the support portion, at least one block of the plurality of blocks constituting the rotary drive unit and the stationary flange can be engaged to be able to transmit power in the rotating direction regardless of the circumferential phase of the rotary drive unit and the stationary flange. That is, as long as at least one block and the stationary flange can be engaged to transmit power in the rotating direction, the plurality of blocks can be disposed at uneven intervals in the circumferential direction. Also, the number of blocks can be set in accordance with the shape of the stationary flange, and can be 1, 2, 3, 4, 5, 6, 7, 8, 9, 10, or 11 or more. For example, the number of blocks may be 6 to 8.

The number of blocks may be six or less or one. When the rotary drive unit is displaced in the direction approaching the support portion, even if the tip surfaces of all the blocks abut the protruding portions of the stationary flange (all the blocks are in the housed state), the rotation of the adapter causes at least one block to shift to the protruding state. That is, when the adapter of the rotary drive unit is rotated, the tip surface of at least one block slides on the axially inner surface of the protruding portion and faces the portion offset from the protruding portion. Then, the block is axially displaced in the direction approaching the support portion, so that the circumferential side surface of the protruding portion can be pressed by the outer circumferential surface of the tip portion of the block.

Figure 8:
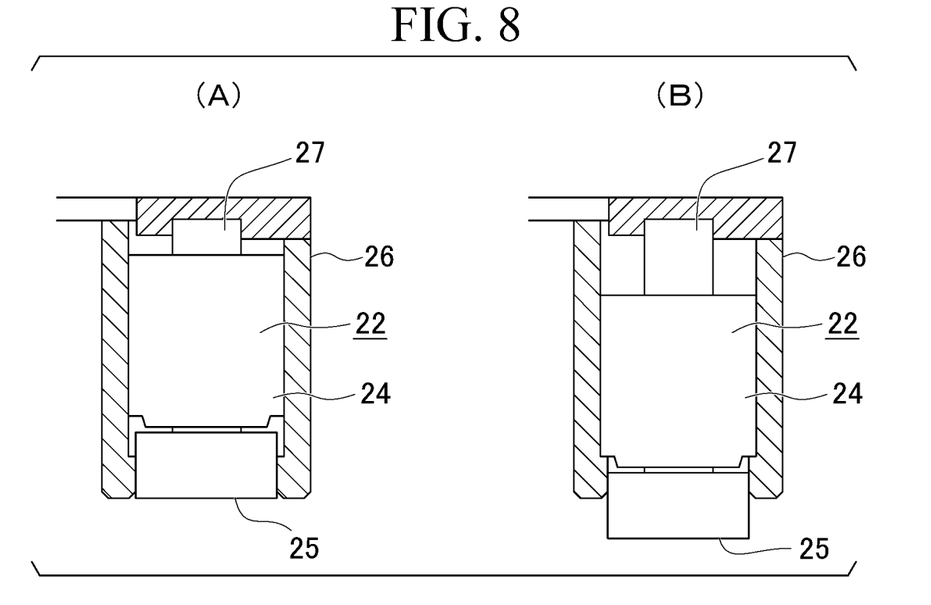
FIG. 8 is a schematic view showing another example of the block.

FIG. 8 is a diagram showing another example of the block 22. As shown in (A) of FIG. 8, in the housed state, the entire guide member 25 of the block 22 is disposed inside the housing member 26 in the support plate (adapter main body) 21. As shown in (B) of FIG. 8, in the protruding state, a portion of the guide member 25 of the block 22 protrudes relative to the support plate 21 and the remaining portion of the guide member 25 is disposed inside the housing member 26 in the support plate 21.

The present invention can be applied not only to a hub unit bearing for a driven wheel whose hub main body is solid, but can also be applied to a hub unit bearing of a driving wheel in which a spline hole for torque transmittable engagement of a drive shaft is provided at a center of a hub main body. Also, in the above, a case where the present invention is applied to a so-called 2.5th generation hub unit bearing including a hub configured by externally fitting a pair of inner rings to a hub main body has been described. The present invention can also be applied to a so-called third generation hub unit bearing including a hub configured by directly forming axially outer side inner ring raceways on an axially outer circumferential surface of a hub main body, and externally fitting an inner ring on an axially inner side of the hub main body.

REFERENCE SIGNS LIST

1 Hub unit bearing
2 Outer ring

3 Hub
4 Rolling element
5 Outer ring raceway
6 Stationary flange
7 Support hole
8 Base portion
9 Protruding portion
10 Inner ring raceway
11 Rotary flange
12 Mounting hole
13, 13z Hub main body
14a, 14b Inner ring
15 Fitting surface portion
16 Caulking portion
17 Rotary caulking device
18 Support portion
19 Rotary drive unit
20 Pressing die
21 Support plate (adapter main body)
22 Block
23 Seat portion
24 Block main body
25 Guide member
26 Cover (housing member)
27 Elastic member
28 Processing portion
29 Convex portion
30 Curved surface portion
31 Cylindrical portion
80 Adapter

The invention claimed is:

1. A method of manufacturing a hub unit bearing, comprising:
supporting a hub main body; and
caulking the hub main body to which an inner ring is attached;
wherein the caulking includes:
pressing a pressing die on the hub main body while the pressing die rotates; and
moving an outer ring around an axis of the hub main body via an adapter, and
the adapter includes:
adapter main body; and
at least one block which is held in the adapter main body, and is disposed to be movable in an axial direction of the hub main body relative to the adapter main body,
each of the at least one block is disposed to be movable in the axial direction between a protruding state in which the block at least partially protrudes in the axial direction from the adapter main body, and a housed state,
in the housed state, an axial end face of the block abuts a first surface of the outer ring, and
in the protruding state, a side surface of the block is disposed to face a second surface that is an outer side surface of the outer ring.

2. The method of manufacturing the hub unit bearing according to claim 1, wherein the adapter includes a biasing member which is configured to apply a force in the axial direction.

3. The method of manufacturing the hub unit bearing according to claim 1, wherein at least a part of the block is made of a synthetic resin.

4. The method of manufacturing the hub unit bearing according to claim 1, wherein elastic members are installed between the adapter main body and the blocks.

5. The method of manufacturing the hub unit bearing according to claim 1, wherein the blocks are rotatably supported.

6. The method of manufacturing the hub unit bearing according to claim 1, wherein a rolling bearing is provided at a tip portion of the block.

7. The method of manufacturing the hub unit bearing according to claim 1, wherein a slide bearing is provided at a tip portion of the block.

8. The method of manufacturing the hub unit bearing according to claim 1, wherein the blocks are supported at a plurality of places of the adapter main body in a circumferential direction thereof.

9. A method of manufacturing a hub unit bearing, comprising:
supporting a hub main body; and
caulking the hub main body to which an inner ring is attached;
wherein the caulking includes:
pressing a pressing die on the hub main body while the pressing die rotates; and
moving an outer ring around an axis of the hub main body via an adapter, and
the adapter includes:
adapter main body; and
at least one block which is held in the adapter main body, and is disposed to be movable in an axial direction of the hub main body relative to the adapter main body,
wherein a rolling bearing is provided at a tip portion of the block.

* * * * *